United States Patent [19]

Pong et al.

[11] Patent Number: 4,962,453
[45] Date of Patent: Oct. 9, 1990

[54] AUTONOMOUS VEHICLE FOR WORKING ON A SURFACE AND METHOD OF CONTROLLING SAME

[75] Inventors: William Pong, Brookfield Center; Joseph F. Engelberger, Newtown; John M. Evans, Jr., Brookfield; William S. Kazman, Danbury, all of Conn.

[73] Assignee: Transitions Research Corporation, Danbury, Conn.

[21] Appl. No.: 307,765

[22] Filed: Feb. 7, 1989

[51] Int. Cl.$^5$ .................................................. G06F 15/50
[52] U.S. Cl. ............................... 364/424.02; 180/167
[58] Field of Search .................... 364/424.02, 513; 180/167–169; 318/568.12

[56] References Cited

U.S. PATENT DOCUMENTS

| | | | |
|---|---|---|---|
| 3,713,505 | 1/1973 | Muller | 180/79 |
| 4,077,535 | 3/1978 | Oriol | 214/515 |
| 4,119,900 | 10/1978 | Kremnitz | 318/587 |
| 4,137,984 | 2/1979 | Jennings et al. | 180/98 |
| 4,306,329 | 12/1981 | Yokoi | 15/319 |
| 4,379,497 | 4/1983 | Hainsworth et al. | 180/168 |
| 4,500,970 | 2/1985 | Daemmer | 364/513 |
| 4,503,581 | 3/1985 | Early | 15/319 |
| 4,600,999 | 7/1986 | Ito et al. | 364/513 |
| 4,603,753 | 8/1986 | Yoshimura et al. | 180/131 |
| 4,628,453 | 12/1986 | Kamejima et al. | 364/424.02 |
| 4,638,445 | 1/1987 | Mattaboni | 364/513 |
| 4,641,251 | 2/1987 | Inoue | 364/513 |
| 4,674,048 | 6/1987 | Okumura | 364/424 |
| 4,700,427 | 10/1987 | Knepper | 15/319 |
| 4,710,020 | 12/1987 | Maddox et al. | 364/424.02 X |
| 4,815,008 | 2/1989 | Kadonoff et al. | 364/513 |

OTHER PUBLICATIONS

*HelpMate: a mobile robot for transport applications*, by Bala Krishnamurthy, Bruce Barrows, Steve King, Tim Skewis, Will Pong, Carl Weiman; Transititions Research Corporation, 15 Great Pasture Rd., Danbury, Conn.
*Robotic systems learn through experience*, Sydney F. Shapiro, Senior Editor, published in *Computer Design*, Nov. 1, 1988.

*Primary Examiner*—Thomas G. Black
*Attorney, Agent, or Firm*—Kramer, Brufsky & Cifelli

[57] ABSTRACT

A means and method for control of an autonomous vehicle while working on a surface, specifically for operation of an automatic floor cleaning machine using power derived from line power through a wall plug and cord. The vehicle uses information derived from contact between bumpers and objects in the environment to sense the geometry of its environment and utilizes a recursively applied algorithm to systematically and efficiently cover the floor area.

23 Claims, 8 Drawing Sheets

AUTONOMOUS VEHICLE FOR WORKING ON A SURFACE AND METHOD OF CONTROLLING SAME

FIELD OF THE INVENTION

This invention relates generally to navigation of autonomous "robot" vehicles about a surface containing obstacles to movement, and in particular, to navigating such a robot vehicle about a floor space containing obstacles, such as furniture. However, other uses for the vehicle would include an automatic lawn mower.

BACKGROUND OF THE INVENTION

Autonomous vehicles are used for applications in hazardous environments such as nuclear reactors, or in carrying out tedious tasks such as transportation and floor cleaning. Transport applications require point-to-point or path following navigation while avoiding obstacles. Floor cleaning applications require nearly complete coverage of the floor, with enough overlap not to leave gaps, but with a minimum of repeated visits to the same area to avoid inefficiency.

A variety of techniques are used for navigation of autonomous vehicles. They generally use odometry to compute and measure vehicle position, coupled with sensors which inform the navigation system of the positions of obstacles or landmarks. Such systems often involve preprogramming the vehicle with information about the geometric layout of the environment, and the positions and characteristics of key landmarks. Daemmer (U.S. Pat. No. 4,500,970) teaches a system which registers vehicle position with the preprogrammed checkpoints in the environment using a variety of sensors. Maddox et al (U.S. Pat. No. 4,710,020) teaches a system in which the vehicle registers its position visually with respect to an active artificial beacon. Kaneko et al (U.S. Pat. No. 4,558,215) describe a system for detecting obstacles by projecting a light beam and using the geometry of reflection for range and position measurement. Krishnamurthy et al ("Helpmate: A Mobile Robot for Transport Applications", Proceedings of SPIE Conference on Mobile Robots, Cambridge, Mass., Nov. 11, 1988) describes a multisensor navigation system in which the robot is trained to a particular environment. Moravec et al ("High Resolution Maps from Wide Angle Sonar", IEEE, 1985) describes a robot navigation system based on sonar.

The prior art techniques are too complex, expensive, and/or large in size to be efficient in low cost applications, such as floor vacuuming in private homes, offices or hotel rooms. In these applications, simpler equipment and lower cost are essential, while preserving efficient performance. Also, whereas in transport systems, the object is to avoid proximity to obstacles, in floor cleaning applications, the object is to come as close as possible to obstacles to assure complete floor coverage. In large scale cleaning operations, it is customary to use cleaning patterns which cover the floor in regular, repetitive patterns such as parallel back and forth patterns used in plowing fields, or spiralling patterns. These are efficient when the scale of the open floor space greatly exceeds the scale of the vehicle, such as in warehouses, dining halls, store aisles, and the like. Such methods are most efficient when some prior knowledge of the layout of the environment is preprogrammed into the autonomous vehicle. However, in small cluttered areas such as hotel rooms, offices, and rooms in private home, such regular patterns cannot be achieved within the confines of the environment, and there is too much variation in position of furniture and obstacles to use a preprogrammed map.

Power requirements for vacuuming are considerably higher than for vehicle transportation. Batteries to provide self-contained power sources are heavy, reducing the efficiency of payload capacity. Economies of scale favor batteries in large equipment, but not in small scale equipment of the scale of domestic vacuum cleaners. For these applications a cord plugged into household line current, for example 120 Volts in the U.S., is preferable. However, one would expect that for autonomous operation, this mechanical connection and trailing cord interfere with the free motion of the vehicle.

SUMMARY OF THE INVENTION

It is an object of the invention to provide an efficient navigation and control system for an autonomous vehicle whose primary mission is to completely and efficiently cover floor space in complicated, cluttered areas.

It is a further object of the invention to avoid preprogramming the vehicle with prior knowledge of the maneuvering environment, and to avoid modifying the environment in any way to accommodate the autonomous system.

It is a yet further object of the invention to provide power for the autonomous vehicle from line current in a wall plug, thereby eliminating self-carried power sources such as batteries, while avoiding the problem of tangling the power cord.

The foregoing problems of navigation, cost, compactness, efficiency, and energy source are overcome and the objects realized by, in accordance with the apparatus and method of the invention, which provide for nearly complete coverage of a floor surface, even in a cluttered environment, without preprogramming the vehicle with information about the geometric layout of the environment.

The invention provides for navigational technique for a vehicle comprising sensing, computation, and control. A contact sensitive bumper detects the position of objects relative to the vehicle. Current sensing circuitry monitors motor current for an over-torque condition indicative of force against an obstacle. Alternatively, the bumper is force sensitive as well as contact sensitive. Odometers on the wheels of the vehicle provide the navigation system with vehicle position and orientation over periods of time commensurate with the floor coverage task.

Preferably, the computation means consists of a microprocessor, the controls for the drive wheels comprise a digital feedback control system, and the algorithm for covering the floor is embodied in a ready-only-memory device.

The method of navigation uses the aforementioned contact (position/force) sensing and a recursive computer algorithm for systematically and efficiently traversing nearly all open floor space.

The navigational technique comprises elementary forward, backward, and turning moves, combined in a recursive fashion to generate fan shaped floor coverage patterns which are linked together in a "tree" structure. That is, the vehicle covers a fan-shaped local area in an iteration of forward, backward and turning moves, and then branches out to peripheral regions, treating each opportunity as a new local area in a subsequent iteration of forward, backward and turning moves, extending its area of coverage from the starting point in a systematic branching pattern.

A central processing unit (CPU) integrates data from all sensors (wheel encoders, bumper, staircase sensor, cord sensor) to develop an estimate of vehicle and obstacle position. Based on this information, the CPU generates an hypothesis about the location of other open space and adds this location to its list of unexplored territory.

The invention provides for a mobile robot whose propulsion and any vacuum or other cleaning process apparatus are powered by a cord plugged into AC line current (household wall socket) in the same manner as a typical household appliance. Interference of the cord with vehicle motion and tangling are avoided by a combination of take-up reel mechanism which eliminates cord slack, and navigational technique which moves the vehicle principally toward and away from the anchored plug, thereby minimizing opportunities for tangling. The plug, of course, must be sufficiently firmly anchored in the wall socket so that it will not pull out under the mild tension of the takeup reel.

The CPU uses a recursive algorithm to find open space and work around obstacles. Beginning at the wall socket, and oriented into the room (at a right angle with respect to a wall), the vehicle turns approximately 90 degrees from its present heading and attempts to travel forward a distance R. If it travels a distance R without encountering an obstacle, then it backs up a distance R. If it contacts an obstacle before traveling distance R it will back up to the starting point. The vehicle then turns an amount inversely proportional to the distance traveled. That is, if it traveled the full distance R then it will only turn a little, so that there is full overlap at the end of the radius. If it encountered an obstacle early, then it will turn more. It will again attempt to traverse a distance R. It will continue in this fashion until approximately 180 degrees have been searched by the vehicle. All cases where the vehicle was able to traverse distance R are potential areas for further exploration. In situations where there are several sequential successful attempts at traversing the distance R, these contiguous areas (blades) are grouped together and called a "sector". Then one or more angles are defined as directions for future exploration. One angle can be used when there are few sequential successful attempts. Several angles can be used to thoroughly explore a large sector.

The vehicle points in the direction marked for exploration and traverses a distance less than or equal to R. It then repeats the basic "fan" search pattern iteration of forward, backward and turning moves. The vehicle explores all hypothetical open areas and only returns when it reaches a position where it sees only obstacles and cannot traverse a distance R over an entire fan.

A cord sensor (44 of FIG. 2) detects the "playout" of the cord from the cord reel, and detects when the cord is entirely played out.

The system is simple, low cost, efficient, and robust, as a result of the novel combination of apparatus and method which comprise the present invention.

The invention simplifies and reduces the user effort required in floor maintenance (i.e., vacuuming, sweeping, polishing, etc.). It will automatically cover open areas in a room and work around obstacles (i.e., furniture, pets, toys, etc.).

This invention is capable of cleaning an arbitrary floor surface automatically without any prior knowledge of room geometry or any other form of preprogramming. The system can be operated with no user intervention other than plugging in the power cord and turning the unit on. The cost of the system is relatively low and is a commercially viable product for use in the home.

Other objects, features and advantages of the invention will become apparent in light of the following description thereof.

DETAILED DESCRIPTION OF THE INVENTION

Figure 1:
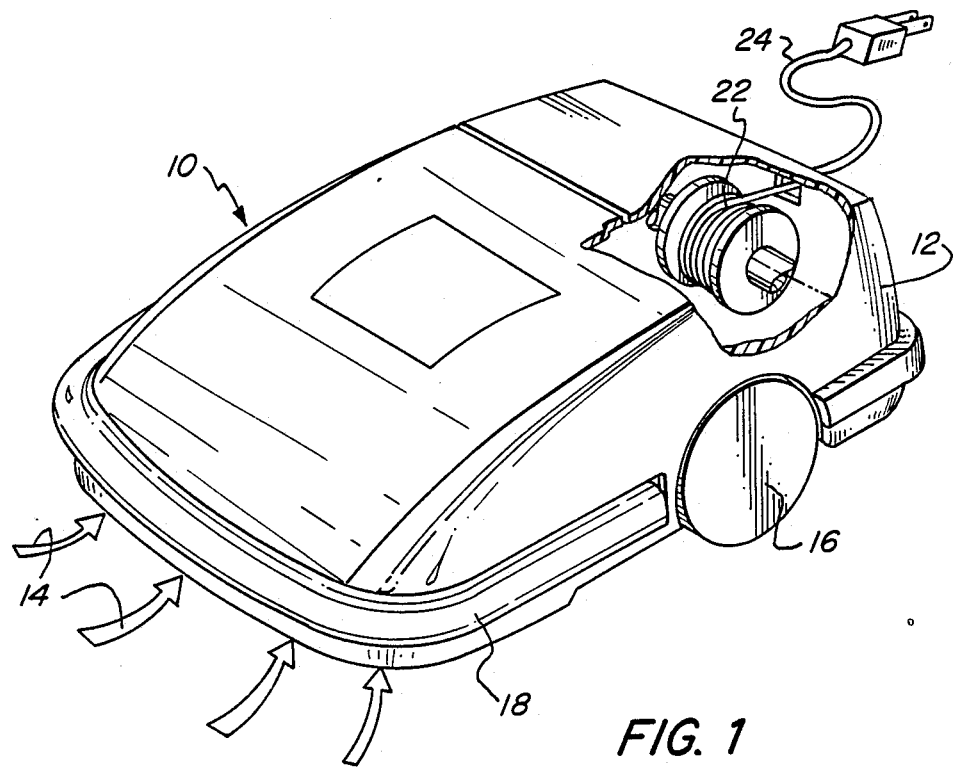
FIG. 1 is a perspective view of a vehicle to which the invention is suited. The vehicle illustrated is a vacuum cleaner.

FIG. 1 illustrates an embodiment of the present invention in an autonomous vacuum cleaner 10, incorporating a body 12, motor (not shown), and vacuum unit (not shown) similar in size, shape, and performance, and power requirements to a domestic canister type vacuum cleaner which operates on AC house current. The vacuum intake is disposed under the front of the unit as indicated by the arrows 14 indicating suction (there is no hose). Wheels 16 (only one visible) are powered by electric motors under servo control of a microcomputer. A bumper 18 about the periphery of the vehicle senses contact with an obstacle, and is suitable to provide information on the position as well as the force of such contact, as is described in greater detail hereinafter. The bumper is preferably mechanically compliant upon collision with objects in the environment. A spring or motor powered takeup reel 22, mounted at the rear of the vehicle, maintains a light tension and eliminates slack in a power cord 24.

Primarily, the bumper 18 is contact sensitive, and indications of the force of contact with an obstacle are derived from drive motor current (torque).

Suitable dimensions of the vehicle are approximately 24 inches (61 centimeters) long, 14 inches (35 centimeters) wide, and 8 inches (21 centimeters) high. The drive wheels 16 are drawn to scale. Typical power requirements for the vehicle are approximately 1000 watts for vacuum, 50 watts for propulsion and 10 watts for electronics. The takeup reel 22 is preferably driven by a passive mechanical rewind spring which pulls up slack when there is little or no tension on the cord. The cord length at maximum extension is suitably 33 feet (10 meters). Typical vehicle velocity is normally about 18 inches per second.

Figure 2:
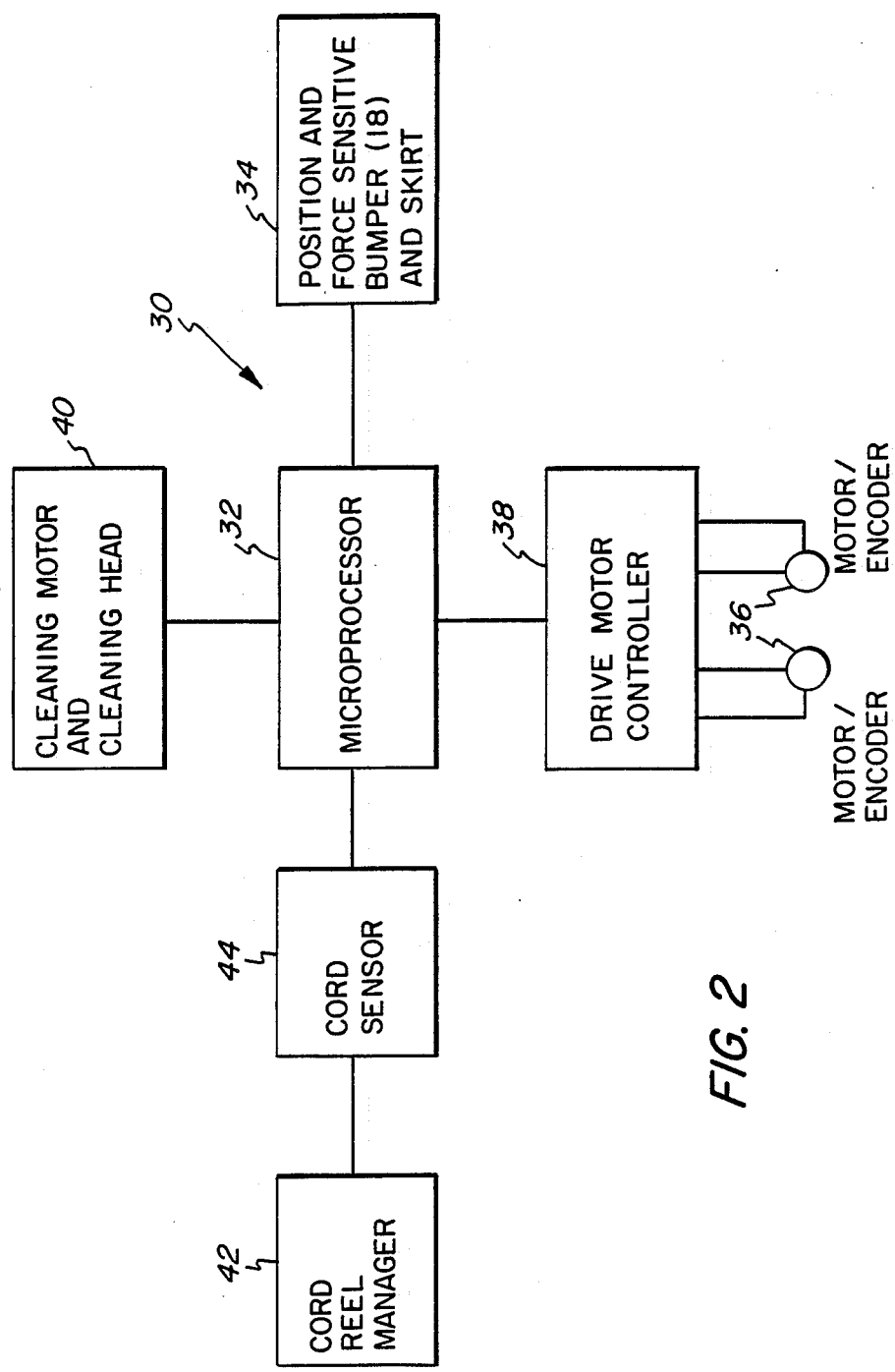
FIG. 2 is a block diagram of an overall control system for the vehicle of FIG. 1.

FIG. 2 is a block diagram of a typical preferred embodiment of the system 30. A microprocessor 32 is the top level controller, taking inputs from contact sensors 34 and odometry (encoder) 36. The microprocessor 32 generates control outputs to drive motor controller 38 and cleaning process equipment (cleaning motor and cleaning head) 40. The microprocessor 32 integrates inputs from contact sensing (bumper 18) and odometry (wheel encoders 36) to estimate the position of the vehicle and obstacles. It incorporates these data as inputs to a recursive algorithm for covering the floor, controlling the drive motors to execute vehicle motions, as described in greater detail hereinafter. The odometry (wheel encoders) may be separate from the wheel motors or integral therewith.

A cord reel manager 42 automatically feeds and retracts the power cord 24 (FIG. 1) on an as needed basis. Constant tension is maintained on the cord via a spring or electric motor. The drive motor controller 38 closes a servo loop around encoders on the motorized drive wheel 16 (FIG. 1) and allows fine control of vehicle position, velocity and acceleration. The force or force and position sensitive bumper 18 can be used to detect obstacles.

Figure 3:
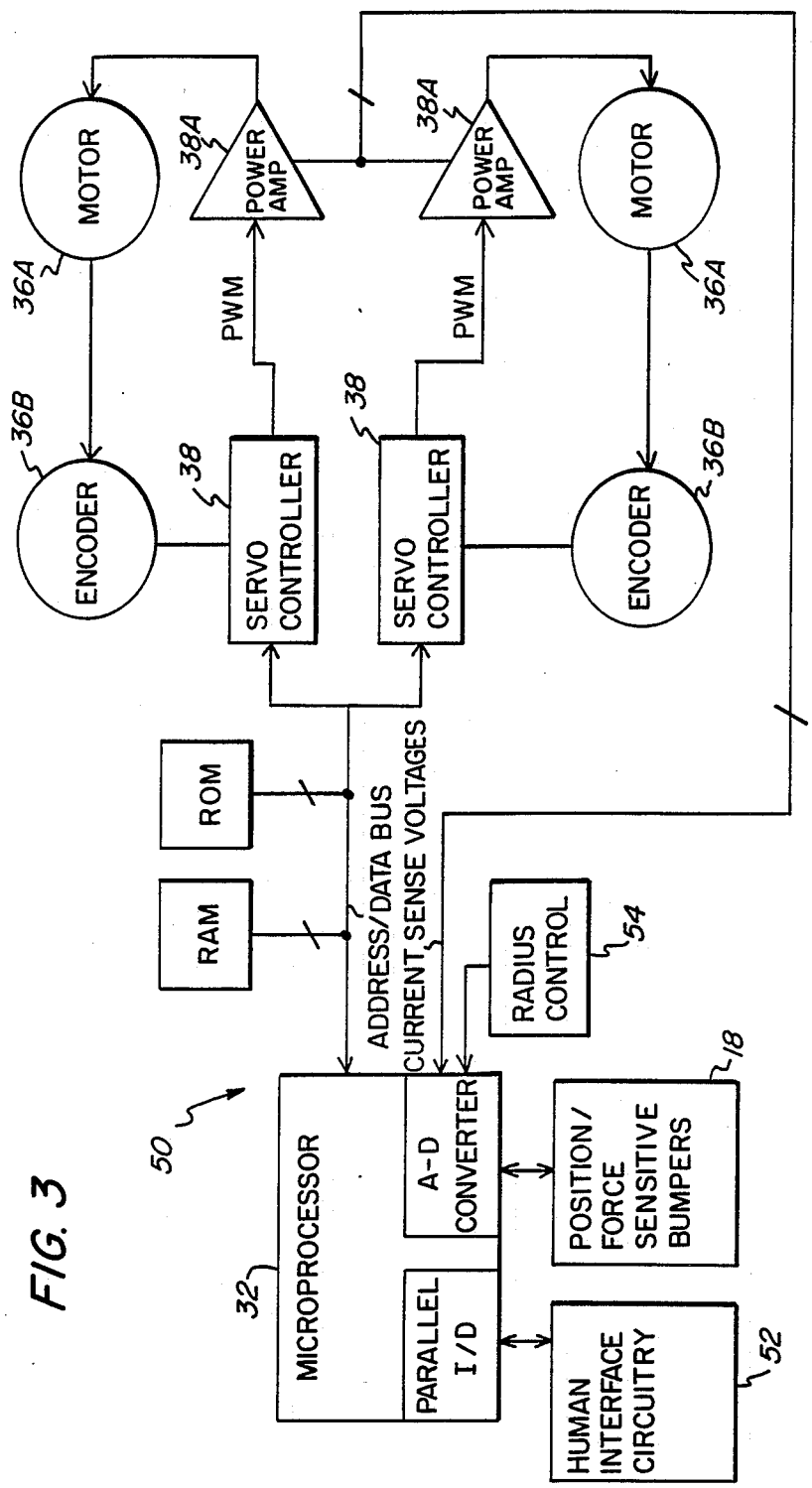
FIG. 3 is a block diagram illustrating the configuration of elements of FIG. 2.

The system, as shown in FIG. 3, may consist of a low cost 8-bit microprocessor 32 such as the Motorola 68HC11, a control version of 6800 microprocessor containing 8 on-chip analog to digital converter channels which are multiplexed into an 8-bit port. There are 8,192 bytes of volatile random access memory (RAM) used for dynamic data and 32,768 bytes of read-only memory (ROM) are used for programs which define the behavior of the system.

The Drive Motor Controller 38 may comprise a digital servo control chip such as the Hewlett-Packard HCTL-1000, and servo amplifiers which drive the motor/encoders 36. Such motors are equipped with encoders such as 500 line quadrature encoders which transmit wheel rotation position and sense to the drive motor controller 38.

FIG. 3 illustrates the system configuration of microprocessor 32 and drive motor controller 38 in one preferred embodiment 50. Those of ordinary skill in the art will recognize that other components may be used in a functionally equivalent manner.

In FIG. 3, the motor/encoders 36 are illustrated as motors 36A and encoders 36B. The drive motor controllers 38 provide a pulse width modulation (PWM) output to power amplifiers 38A, such as Motorola Sensefet H-Bridge or Sprague UDN-2965W-2 Power Amplifiers, connected as shown to provide current sense voltages to the microprocessor 32.

In one embodiment, the vehicle is equipped with three wheels, a forward, passive, pivotable wheel, and two driven wheels, the three wheels arranged in a tricycle configuration. Turning is accomplished by differentially driving the two driven wheels.

Alternatively, the vehicle has a total of two wheels, both driven differentially to effect steering. In this case, the vehicle would rest on the front vacuum (power) nozzle as the third point of contact with the floor. Gliders may be used to decrease friction at the points of nonrolling contact with the floor.

In FIG. 3 are shown human interface circuitry 52 and a radius control 54. The human interface circuitry 52 would include user interfaces such as an on/off switch, indicator lights, and the like. The radius control 54 would provide user input to set the radius "R", or forward exploratory travel distance of the vehicle, which is discussed in greater detail hereinafter.

Figure 4A:
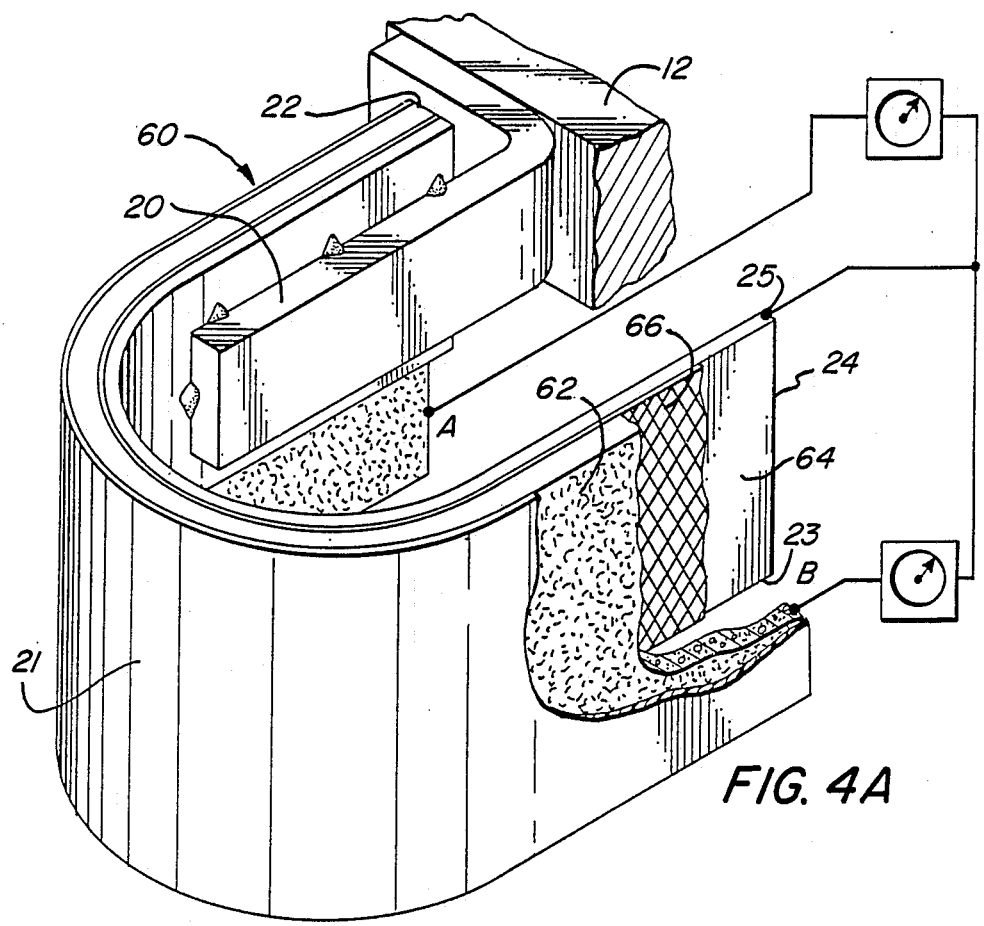
FIG. 4A is a perspective view, partially cut away, of a bumper suitably employed in the vehicle of FIG. 1.
Figure 4B:
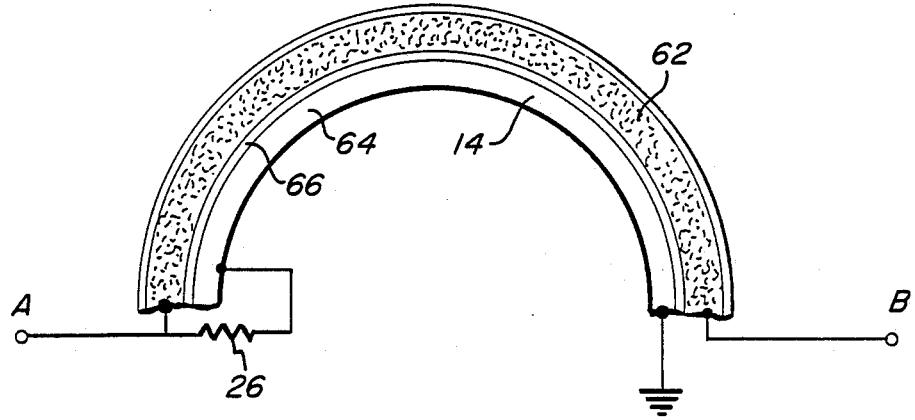
FIG. 4B is a schematic representation of the bumper of FIG. 4A.

FIGS. 4A and 4B illustrate an embodiment 60 of the construction of the position and force sensitive bumper (18 of FIG. 1). A compliant layer of conductive foam 62 such as used in packing semiconductor chips is separated from a highly conductive plate 64 by an insulating mesh 66. On contact with an object in the environment, the foam 62 squeezes through the mesh 66 and makes contact at the contact point with the conductive plate 64. A voltage divider is thereby formed, as indicated by the meters 68, and both contact position and contact force can be determined. FIG. 4B is a more diagrammatic representation of the bumper 60, suitable for use as the bumper 18 of the vehicle 10. The bumper 60 is described in greater detail in commonly-owned, co-pending U.S. patent application No. 265,784 filed on Nov. 1, 1988, entitled "Bumper for Impact Detection".

Alternatively, the bumper 18 may simply be a pneumatic tube around at least the front periphery of the vehicle, said tube in communication with a pressure switch, to detect contact of the vehicle with an obstacle. A suitable pneumatic switch arrangement is described in U.S. Pat. No. 4,669,597, entitled ESCALATOR SKIRT PANEL DEFLECTION SWITCH.

Figure 5:
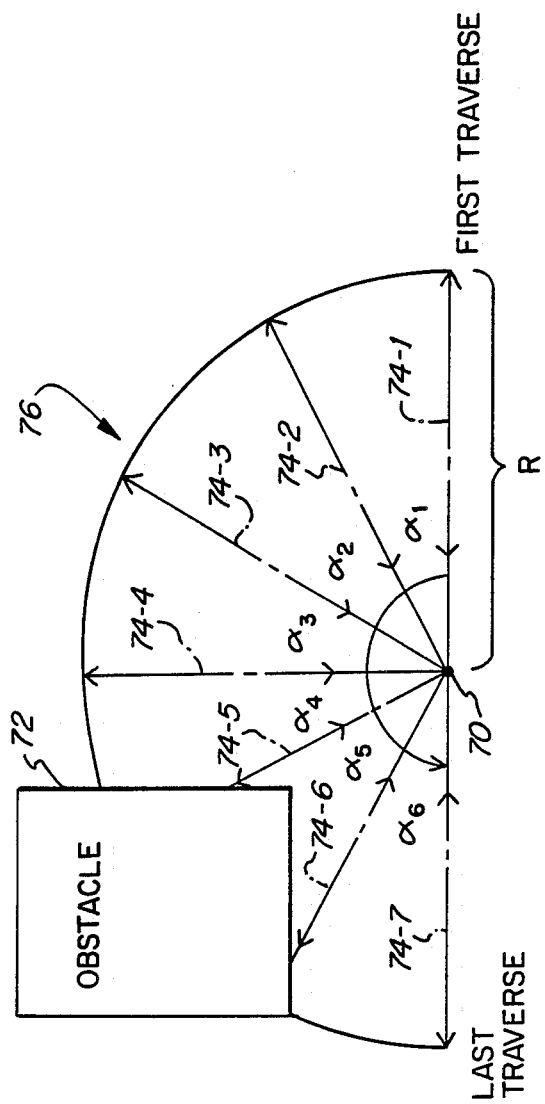
FIG. 5 is a graphic representation of basic movements for the vehicle of FIG. 1.

FIG. 5 is a graphic representation of the basic vehicle movements. The elementary moves of the vehicle are straight motions forward (traverses) and backward (returns), as well as turns in place (zero radius turns). The elementary behavior of the vehicle is to move forward from an origin point 70 until a specified forward distance (radius) "R" has been traversed, or until an obstacle 72 is hit by the bumper. (By definition, an obstacle would only be encountered at a distance less than "R" from the origin point 70.) A first traverse is represented by the line 74-1. After completing a forward traverse, the vehicle backs up exactly the same distance to the origin point. In other words, the traverse distance equals the return distance, although the directions are opposite. When the backing motion is complete, the vehicle stops at the origin point 70 and turns in place through an angle $a_1$, which is inversely proportional to the distance just traveled in the backing move. This relationship between distance traversed and turn angle is termed the "turn angle rule". Another forward exploratory move is then made. A second traverse is represented by the line 74-2, and a corresponding second turn angle is designated $a_2$, and so forth, until the vehicle has explored 180 degrees of the environment.

FIG. 5 illustrates how the repetition (recursion) of such elementary moves yields a "fan" shaped floor coverage pattern 76 whose boundary is limited by obstacles. The turn angle rule assures efficient overlap of coverage between the "blades" of the fan. (A "blade" is the area between successive traverses, e.g., 74-3 and 74-4.) For purposes of this discussion, the turns employed for generating the fan are in the counter-clockwise direction. The radius of the fan is at most "R", and for floor vacuuming, R is typically set at 5-10 feet (1.5-3 meters). (The exploratory radius, R, is user-selectable via the radius control 54 of FIG. 3.) The optimum value of R is proportional to the size of the room to be cleaned and the amount of open space in the room. Values of "R" from 3 feet to 10 feet are reasonable.

There is a simple formula to determine the angular increment to the next radial movement (traverse) in any one fan.

By mathematical definition, $$a = r \times \alpha,$$

where
- a=arc segment
- r=radius
- α=angle (in radians)

This simple formula can be applied as follows, where a is approximated by the vacuum nozzle width=w
- r=the actual distance traveled (one way) in the last radial motion (traverse)
- α=angular increment In order to obtain a slight overlap, let $w = 0.9 \times a$. This gives the current angular increment, for the next traverse:

$$\alpha = \frac{w}{r}$$

All cases where the vehicle was able to traverse distance R are potential areas for further exploration. In situations where there are several, such as two or more, sequential successful attempts at traversing the distance R, these contiguous areas (blades) are grouped together and called a "sector". Then one or more angles are defined as directions for future exploration. One angle can be used when there are few sequential successful attempts. Several angles can be used to thoroughly explore a large sector.

The completion of elementary forward, backing and turning moves to complete a single fan pattern is termed an "iteration".

Figure 6A:
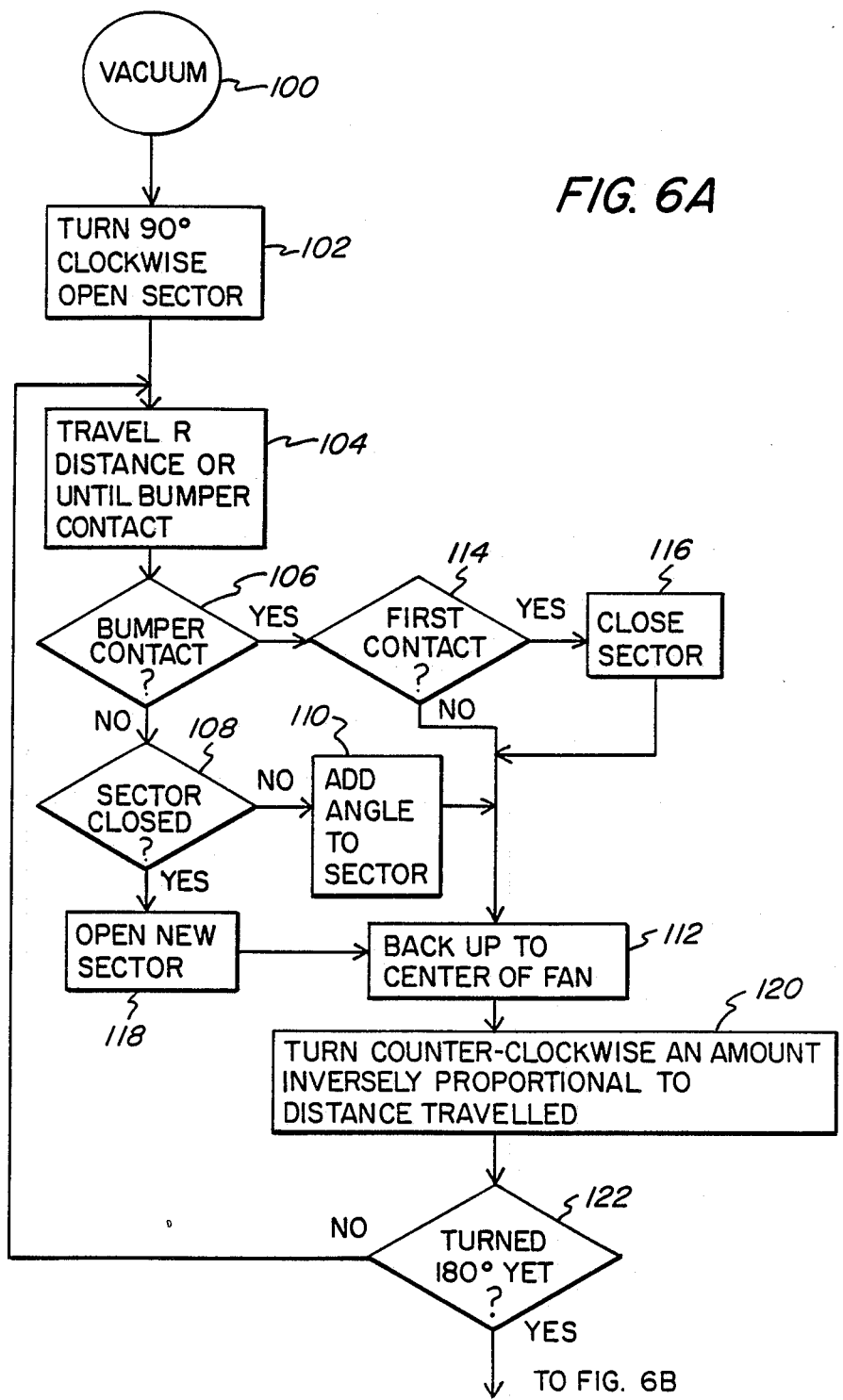
FIGS. 6A and 6B are a flowchart of a navigation algorithm for the vehicle of FIG. 1.
Figure 6B:
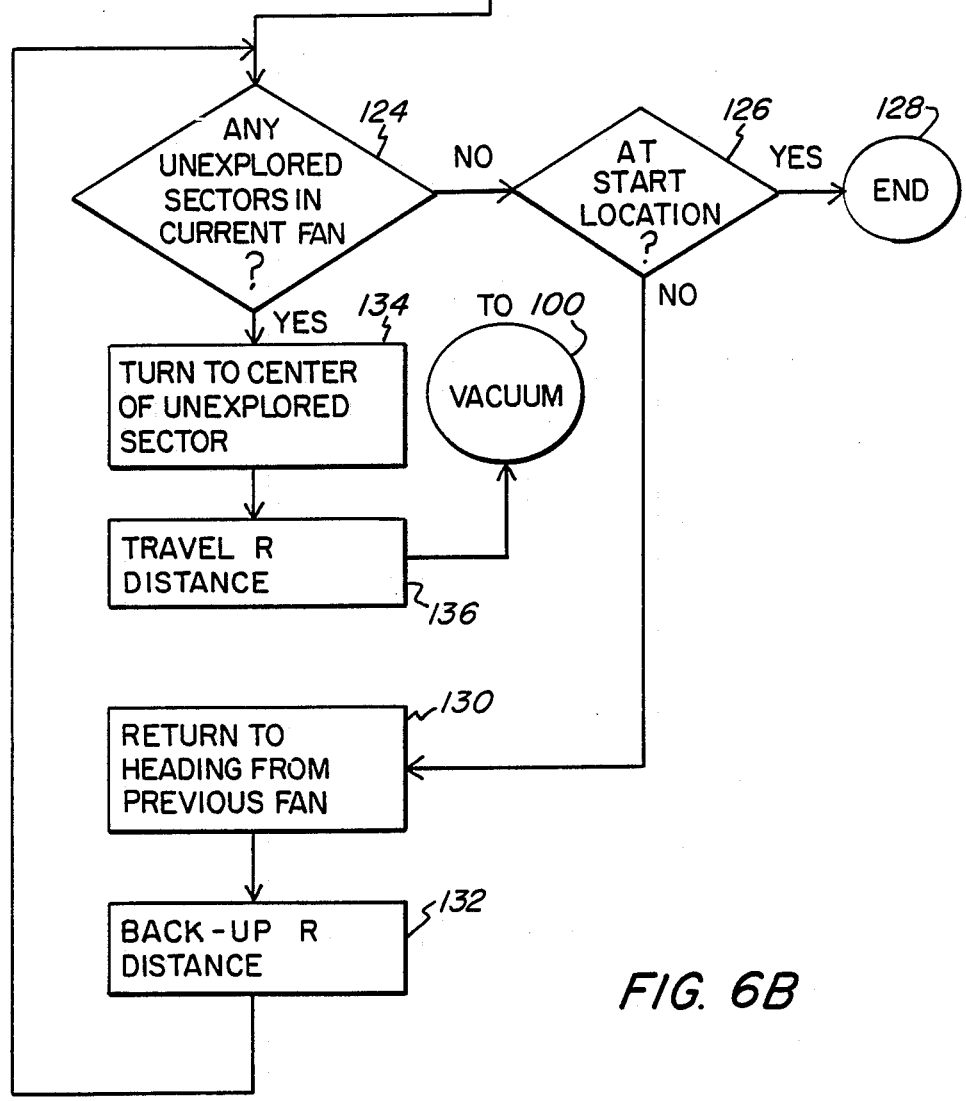
Figure 7:
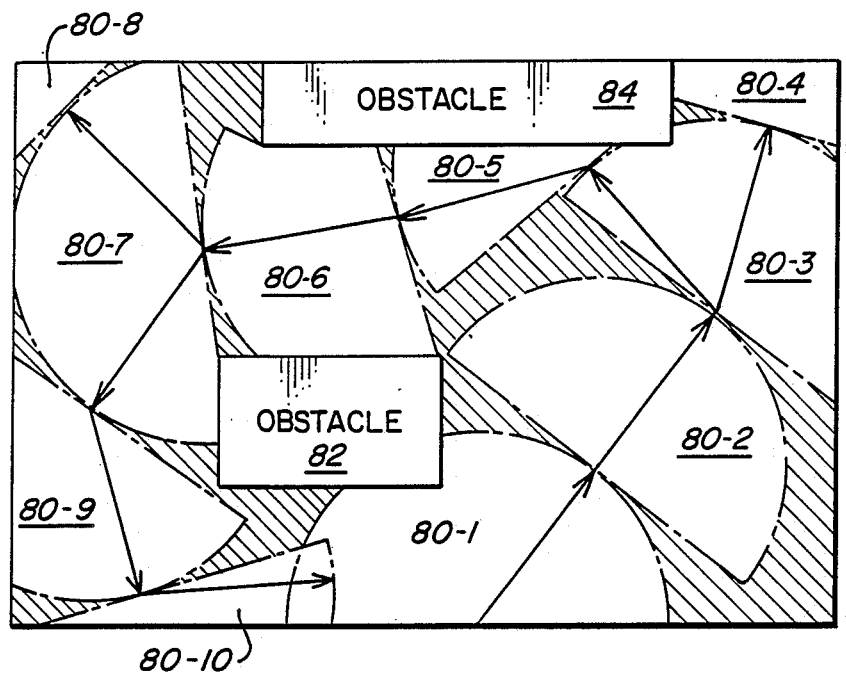
FIG. 7 is a graphic representation of a sequence (such as is described with respect to FIG. 6) of movements (such as are illustrated in FIG. 5) for the vehicle of FIG. 1, illustrating movement of the vehicle about a confined plan area (floor surface) containing obstacles (furniture).

FIGS. 6A and 6B are a flowchart of the navigation algorithm of the vehicle. It generates a plurality of fan shaped patterns 76 which are sequenced and linked in a tree-like fashion as illustrated in FIG. 7.

The cleaner is plugged into a wall socket and pointed away from the wall. After the unit is turned on it will automatically explore its environment and attempt to traverse all of the open space. Upon completing the cleaning of the room it will return to its starting location and turn itself off.

The routine of FIG. 6A is entered through a step 100. In a first step 102, the vehicle turns ninety degrees clockwise (to align with the wall) and opens a sector.

A "sector" is defined as two or more successful traverses, in other words, traverses of the full distance "R", without contacting an obstacle. At the beginning of each fan, a sector is opened in anticipation of a traverse the distance "R". When an obstacle is encountered on a traverse, the sector is closed. Since each blade, as defined by two sequential traverses, is on the order of five degrees, when large sectors are developed, for instance on the order of fifty or more degrees (ten or more traverses), rather than simply bisect, or trisect, the sector for further exploration (i.e., for subsequent fans), it may be preferable to define two or more subsectors within the large sector. In terms of the navigational system described herein, each of those subsectors would simply be treated as a sector for future exploration.

When all of the sectors (including subsectors, if any) in a current fan have been explored, the vehicle returns to the previous fan to explore any unexplored sectors. This process of "backtracking" continues until all of the sectors in all of the fans have been explored. This indicates the end of the vehicle's working upon the surface.

Thus, it is readily seen how the vehicle branches out, fan after fan, until the end of the cord is reached. (In the "last" fan, the end of cord is treated as an obstacle.) Then the vehicle works its way back to the first fan, exploring out again each time it reaches a fan with unexplored sectors, until it arrives back at the first fan and has explored all of the sectors associated therewith.

The "tree" pattern so developed is highly beneficial in the context of a vehicle powered by house current (mains). The object of not entangling the cord as it drags behind the vehicle is efficiently attained.

Next, in a step 104, the vehicle travels forward a distance which would be "R" if there is no bumper contact, or less than "R" if there is bumper contact.

It is determined in a step 106 whether there was bumper contact at the step 104. If there was no bumper contact, it is determined in a step 108 whether the sector has been closed. If the sector was not closed, a fixed minimum turn angle α is added to the sector at a step 110, and the vehicle backs up to the origin (center of the fan) at a step 112.

If, in the step 106 there was bumper contact (i.e., an obstacle at a distance less then "R" from the origin along the vehicle path), it is determined in a step 114 whether such contact was the first contact in the current sector. If so, the sector is closed in a step 116, and the vehicle backs up to the origin at the step 112. If such contact was not the first contact in the current sector, the sector is kept open and the vehicle backs up to the origin at the step 112.

If there was no bumper contact, as determined at the step 106, and the sector was closed, as may occur at the step 116, a new sector is opened at a step 118, and the vehicle backs up to the origin at the step 112.

In any of the above cases, representing the range of exploratory possibilities, after backing up to the origin, in a step 120 the vehicle turns counterclockwise an amount inversely proportional to the outward distance traveled (as noted in the step 104). The sum of such counterclockwise turns at the origin is maintained.

In a step 122 it is determined whether, for the current sector, the vehicle has turned a total of 180 degrees. Depending on the specific application of the vehicle, angles greater than or less than 180 degrees may be employed as the fan limit. If not, a new forward exploratory traverse is commenced at the step 104, and so on until 180 degrees have been explored. (See FIG. 5 for a graphic depiction of the fan pattern generated.)

If all 180 degrees in the current sector have been explored, it is determined at a step 124 whether there are any unexplored sectors in the current fan. If not, it is determined in a step 126 whether the vehicle is at the start (origin) position. If the vehicle is at the start position, the routine is exited at a step 128. If the vehicle is not at the start position, it returns to the heading from the previous fan and backs up a distance "R", in steps 130 and 132, and the determination of whether there are any unexplored sectors in the current fan recommences at the step 124.

If there are unexplored sectors in the current fan, the vehicle turns to the center of the unexplored sector at a step 134, travels a distance "R", in a step 136 and the routine of FIG. 6A is recommenced at the step 100.

In more general terms, the sequence and linkage arise as follows. As the vehicle is generating a fan from a sequence of out-and-back elementary moves and counter-clockwise small turns, it keeps track of moves which traverse the full radius "R". Contiguous boundary elements (blades) so characterized are grouped into (defined as) a "sector". Upon completing the current fan (i.e., the current iteration of exploratory traverses and returns), the vehicle moves to a location "R" distance from the start point at an angle within, such as that bisects, the most clockwise sector. This location serves as the starting point of a new fan, which is treated in the same manner.

It is easily seen that this strategy may be generalized into more optimal floor coverage by using the midpoint of the chord of the sector, rather than the midpoint of the arc. The exploratory traverse of the vehicle would thus be less than "R". This would increse the coverage gap between fan 80-1 and fan 80-2 (of FIG. 7), for example. Alternatively, large sector angles might be trisected, rather than bisected to reduce such gaps in floor coverage.

When a fan is reached which has no sectors, i.e., it contains obstacles less than "R" distance away from the fan center on every traverse, the vehicle backs up to the center of the previous fan and the sector can be described as "explored". The vehicle then travels to a start point for a new fan determined by the next most clockwise sector and executes the new fan as described above. If all of the sectors in the current fan have been exhausted, the vehicle travels to the center of the adjacent fan between the current fan and the algorithm start point and this sector can be described as "explored". When all of the sectors have been "explored" and the vehicle has returned to the algorithm start point, the algorithm terminates.

The fans in FIG. 7 are marked with visitation order, i.e., the fans 80-1 through 80-10 are visited in sequence. In a typical office or room of a private home, fan depth (i.e., the radius "R") would typically be 3 to 4 feet (approximately 1 meter). Overlap coverage ratio ranges from 2:1 to 3:1. Approximately 20% or less of the floor would be left uncovered, but the missed areas are typically low traffic areas close to obstacles or in alcoves. Typical obstacles could be a desk 82 and a credenza 84.

The above described navigation technique is efficient in covering complicated spaces and does not require accessing, constructing, or maintaining a map of the environment. A minimum of sensing and computing equipment is needed, yet sensing is robust and complete. Cost is low and conventional electrical appliance power sources are used.

A "sector" is defined as two or more successful traverses, in other words, traverses of the full distance "R", without contacting an obstacle. At the beginning of each fan, a sector is opened in anticipation of a traverse the distance "R". When an obstacle is encountered on a traverse, the sector is closed. Since each blade, as defined by two sequential traverses, is on the order of five degrees, when large sectors are developed, for instance on the order of fifty or more degrees (ten or more traverses), rather than simply bisect, or trisect, the sector for further exploration (i.e., for subsequent fans), it may be preferable to define two or more subsectors within the large sector. In terms of the navigational system described herein, each of those subsectors would simply be treated as a sector for future exploration.

When all of the sectors (including subsectors, if any) in a current fan have been explored, the vehicle returns to the previous fan to explore any unexplored sectors. This process of "backtracking" continues until all of the sectors in all of the fans have been explored. This indicates the end of the vehicle's working upon the surface.

Thus, it is readily seen how the vehicle branches out, fan after fan, until the end of the cord is reached. (In the "last" fan, the end of cord is treated as an obstacle.) Then the vehicle works its way back to the first fan, exploring out again each time it reaches a fan with unexplored sectors, until it arrives back at the first fan and has explored all of the sectors associated therewith.

The "tree" pattern so developed is highly beneficial in the context of a vehicle powered by house current (mains). The object of not entangling the cord as it drags behind the vehicle is efficiently attained.

What is claimed is:

1. A method of controlling the movement of an autonomous vehicle working on a surface, said vehicle having means for moving the vehicle, means for turning the vehicle, means for determining the distance traversed by the vehicle and means for sensing contact of the vehicle with an obstacle, comprising:
   a. establishing a starting point for the vehicle to work on the surface;
   b. from an origin point, initially at the starting point, causing the vehicle to traverse a distance "R", or until the vehicle encounters an obstacle;
   c. causing the vehicle to return to the origin after traversing the distance "R" or encountering an obstacle;
   d. upon completion of the return in the step c, at the origin, turning the vehicle through an angle; and
   e. in an "iteration", repeating the steps b, c and d until the total of the angles turned in the step d reaches a predetermined limit.

2. A method according to claim 1, wherein, in the step d, the vehicle is turned through an angle inversely proportional to the distance traversed in the step b.

3. A method according to claim 1, wherein the predetermined limit is 180 degrees.

4. A method according to claim 1, further comprising:
   f. upon reaching the predetermined limit, moving the vehicle to a location a distance "R" or less from the origin, said location defining a new, exploratory origin point for further movement of the vehicle; and
   g. iterating the step e using the new origin point.

5. A method according to claim 4, wherein a sector is defined by the subsequent successful traverses of a distance "R" in the step b.

6. A method according to claim 5, wherein, in the step f, the vehicle is moved a distance "R" to the midpoint of an arc defined by the sector, said midpoint of the arc being the new, exploratory origin point.

7. A method according to claim 5, further comprising:
   h. repeating the steps f and g in sequential iterations of the step e until in a current iteration of the step e it is determined that there are no sectors.

8. A method according to claim 7, further comprising:
   i. after determining that there are no sectors in the current iteration of the step e, returning to the origin point used in the previous iteration of the step e and exploring any unexplored sectors in that iteration.

9. A method according to claim 8, further comprising:

j. repeating the step i until the vehicle has arrived at the starting point and there are no unexplored sectors in the first iteration of the step e.

10. A method according to claim 5, wherein, for large sectors, the sector is divided into subsectors, each subsector being treated as a sector for further exploration.

11. A method according to claim 10, wherein a large sector is defined as approximately ten or more contiguous traverses the distance "R" in a current iteration of the step e.

12. A method according to claim 4, wherein, in the step f, the vehicle is moved a distance less than "R" to the midpoint of a chord defined by the sector, said midpoint of the chord being the new, exploratory origin point.

13. A method according to claim 4, further comprising:
   h. repeating the steps f and g until the vehicle has reached a predetermined distance from the starting point.

14. A method according to claim 13, wherein the predetermined limit is the length of a cord providing power to the vehicle from a wall outlet (main).

15. A method according to claim 4, further comprising:
   h. defining a sector as one or more successive traverses which result in the vehicle traversing the distance "R", in the step b, for a current iteration of the step e; and
   i. in the step f, moving the vehicle along a path bisecting a sector to the location defining a new origin for the next iteration of the step e.

16. A method according to claim 15, wherein:
   j. in the step d the vehicle is turned in one angular direction; and
   k. in the event that more than one sector is defined by an iteration of the step e, moving the vehicle in the step i along a path bisecting the sector most opposite the direction the vehicle is turned in the step j.

17. A method according to claim 15, further comprising:
   j. in the event that a current iteration of the step e results in no sectors, causing the vehicle to return to the origin point for the previous iteration of the step e; and
   m. in the step f, moving the vehicle along another sector to a location defining a new origin for the next iteration of the step e.

18. A method according to claim 1, wherein the starting point is adjacent a wall outlet, and further comprising:
   prior to performing the step b, turning the vehicle to align with a wall.

19. A method according to claim 1 wherein the vehicle is a floor vacuuming machine.

20. A method according to claim 1 wherein the vehicle derives power through a cord from household current (mains).

21. A method according to claim 20, further comprising:
   f. sensing when the cord is entirely played out from the vehicle; and
   g. treating the entire playing out of the cord from the vehicle as the vehicle encountering an obstacle for the purposes of the step b.

22. Apparatus for working on a surface, comprising:
   a vehicle;
   means for moving of the vehicle;
   means for turning the vehicle;
   means for determining distance traversed by the vehicle;
   means for sensing contact of the vehicle with an obstacle; and
   means, responsive to the means for determining distance and the means for sensing contact, for controlling the movement of the vehicle from an origin point, and for controlling the turning of the vehicle at the origin point;
   wherein the means for controlling causes the vehicle to traverse from an origin point a distance "R", or until the vehicle encounters an obstacle, and to return to the origin point;
   wherein, after a traverse and return, the means for controlling causes the vehicle to turn through an angle at the origin point and then traverse from the origin point a distance "R", or until the vehicle encounters an obstacle, and to return to the origin point, repeatedly, until the cumulative angle turned through at the origin by the vehicle reaches a limit.

23. Apparatus according to claim 22, wherein, after a traverse and return, the vehicle is caused to turn at an angle inversely proportional to the distance traversed.

* * * * *